United States Patent
McCune et al.

(10) Patent No.: US 6,977,040 B2
(45) Date of Patent: Dec. 20, 2005

(54) INTEGRATED FILTER HOUSING WITH ASSOCIATED CLEANING SYSTEM AND METHOD

(75) Inventors: Daniel P. McCune, Derrick City, PA (US); Michael A. Sutherland, Jr., Derrick City, PA (US); Thomas S. Harvey, Kane, PA (US)

(73) Assignee: Allegheny Bradford Corporation, Lewis Run, PA (US)

( * ) Notice: Subject to any disclaimer, the term of this patent is extended or adjusted under 35 U.S.C. 154(b) by 494 days.

(21) Appl. No.: 09/812,059

(22) Filed: Mar. 19, 2001

(65) Prior Publication Data

US 2002/0130092 A1   Sep. 19, 2002

(51) Int. Cl.⁷ .......................... B01D 29/62; B01D 29/52
(52) U.S. Cl. .................. 210/248; 210/323.2; 210/407; 210/409; 210/443
(58) Field of Search ............................ 210/248, 323.2, 210/332, 232, 407, 409, 413, 414, 791, 797, 210/323.1, 435, 443; 134/22.1, 22.12, 24, 134/167 R, 172, 177

(56) References Cited

U.S. PATENT DOCUMENTS

| | | |
|---|---|---|
| 1,687,012 A | 10/1928 | Forth |
| 1,743,953 A | 1/1930 | Beatty |
| 1,919,570 A | 7/1933 | Pickard |
| 2,335,604 A | 11/1943 | Ohlinger |
| 3,001,533 A | 9/1961 | Holdren |
| 3,031,148 A | 4/1962 | Holdren |
| 3,311,235 A | 3/1967 | Ahlfors et al. |
| 3,388,802 A | 6/1968 | Wilkinson |
| 3,511,374 A | 5/1970 | Beal |
| 3,670,895 A | 6/1972 | Goodpasture |
| 3,727,764 A * | 4/1973 | Ogden ........................ 210/232 |
| 3,727,841 A | 4/1973 | Hengesbach |
| 3,856,570 A | 12/1974 | McDermott |
| 4,022,693 A | 5/1977 | Morgan, Jr. |
| 4,128,480 A * | 12/1978 | Lumsden ..................... 210/332 |
| 4,187,179 A | 2/1980 | Harms |
| 4,208,219 A | 6/1980 | Etscheid |
| 4,239,626 A | 12/1980 | Vamvakas |
| 4,246,114 A | 1/1981 | Krebs et al. |
| 4,284,500 A | 8/1981 | Keck |
| 4,322,293 A | 3/1982 | Morgan, Jr. |
| 4,331,535 A * | 5/1982 | Pett ............................ 210/85 |
| 4,402,828 A * | 9/1983 | Edens ..................... 210/323.2 |
| 5,462,653 A | 10/1995 | Hills |
| 5,591,329 A | 1/1997 | Davidson |
| 5,643,467 A | 7/1997 | Romanco |
| 5,667,683 A | 9/1997 | Benian |

(Continued)

OTHER PUBLICATIONS

Pall Selection Guide SANLIL Style filter Housings; Housing Data Sheet H21, 1987.*

(Continued)

Primary Examiner—Robert A. Hopkins
(74) Attorney, Agent, or Firm—Reed Smith LLP

(57) ABSTRACT

A multiround filter housing apparatus, cleaning system and method are provided. A filter housing having an integrated base that includes an integral cartridge plate, a plurality of cartridge filter bores, an inlet manifold and an outlet manifold is presented. The upper face of the integral cartridge plate is recessed to facilitate drainage of product and cleaning media. The lower portions of the cartridge filter bores are connected to the outlet port by additional sloped bores, thereby eliminating the need for a collection chamber. A spray device assembly is provided to facilitate a complete "Clean-in-Place" system in conjunction with the filter housing of the present invention.

14 Claims, 5 Drawing Sheets

U.S. PATENT DOCUMENTS

| | | |
|---|---|---|
| 5,858,231 A | 1/1999 | Drori |
| 5,882,528 A | 3/1999 | Davidson |
| 6,071,404 A | 6/2000 | Tsui |
| 6,168,722 B1 | 1/2001 | Olsen et al. |
| 2002/0130092 A1 * | 9/2002 | McCune et al. ............ 210/791 |

OTHER PUBLICATIONS

Pall Selection Guide SANE2 Style filter Housings; Housing Data Sheet H25, 1987.*

Product Brochure, Meissner Filtration Products, Inc., www.meissner.com/content/default.html, 2000.

Product Brochure, Meissner Filtration Products, Inc., www.meissner.com/content/products/housings/house.shtml, 2000.

Product Brochure, Osmonics Sanitary Stainless Steel Cartridge Filter Housings, www.osmonics.com/products, 2000.

Product Brochure, Osmonics 7-Round HX Stainless Steel Cartridge Filter Housings, www.osmonics.com/products.html/Page 13.htm, 2000.

Product Brochure, Osmonics Memtrex-FE Filter PTFE Membranes; P/N 116196 Rev-D, 1996.

Product Brochure, Beach Filters, www.beachfilters.com/products/index.html.

Product Brochure, Cuno Incorporated, Industrial Fluid Purification, www.cuno.com/industrial/ind_housing.html, 2000.

Product, Brochure, Cuno Incorporated, Industrial Fluid Purification, www.cuno.com/industrial, 2000.

Product Brochure, Cuno Incorporated, Industrial Fluid Purification, www.cuno.com/industrial/general.html, 2000.

Product Brochure, Allegheny Bradford Corporation.

* cited by examiner

INTEGRATED FILTER HOUSING WITH ASSOCIATED CLEANING SYSTEM AND METHOD

FIELD OF THE INVENTION

The present invention relates generally to filter housings and, more particularly, relates to an integrated multi-round filter housing with associated systems and methods for cleaning the filter housing using Clean-in-Place (CIP) technology.

BACKGROUND

Filter housings are widely used in a variety of applications in the pharmaceutical, food, fine chemical and water purity industries to filter or purify fluids. Processing pressures may typically range from less than 10 p.s.i. to approximately 1000 p.s.i., depending on the specific product being filtered. Traditionally, a filter housing includes a base assembly with a deep collection chamber, a cartridge plate with a plurality of longitudinal filter cartridges attached thereto, and a dome which fits over the top of the entire filter housing (see generally, FIG. 1). These elements are typically sealed against each other using a plurality of O-rings or other gasket-type sealing devices. A plurality of bolt assemblies are then used to compress the filter housing dome against the base assembly, thereby squeezing the two O-rings against the intermediate cartridge plate.

This prior art design suffers from a variety of potential and actual problems. The prior art design contains an unacceptable number of constituent elements included in the filter housing. Many of these elements must be removed and cleaned separately after every production run, and the junctions or joints between each of these elements create areas that may include tiny crevices and cracks which may promote bacterial growth.

Additionally, there are many horizontal surfaces in typical prior designs which promote the collection or "pooling" of both unfiltered product (on the upper face of the cartridge plate) and filtered product (on the lower face of the collection chamber). This pooling wastes both unfiltered and filtered product, and may promote bacterial growth. Also, certain pooled product may be toxic or otherwise harmful which may endanger the safety of an operator during filter housing assembly and disassembly.

Finally, the orientation of the various elements of the prior art filter housings limit the ability to use an automated cleaning system, such as Clean-In-Place (CIP) technology. Automated cleaning of these prior art systems may necessitate the use of specialized additional adapters. Manual cleaning increases the time between production cycles, requires valuable manpower, and reduces the overall efficiency of the filtering system. Additionally, automated cleaning techniques may be more repeatable and accurate than manual systems, and may further be safer for operators when volatile chemicals are used in the cleaning process.

SUMMARY OF THE INVENTION

The present invention relates generally to filter housings and, more particularly, relates to an integrated multi-round filter housing with associated systems and methods for cleaning the filter housing using Clean-in-Place (CIP) technology. The present invention generally includes an integrated filter housing with a one-piece tooled base assembly to decrease the number of elements to be cleaned, the amount of wasted product, cleaning time, and surface area for contaminants. The filter housing is preferably adapted to use CIP cleaning technology for effective, safe and efficient cleaning of the interior portions of the filter housing.

The filter housing preferably includes an integrated base that is machined or tooled from a single piece of material. The integrated base preferably includes a plurality of machined bores adapted to accept longitudinal filter cartridges inserted therein. The base plate preferably contains a plurality of sloped bores running from the bottom of each filter cartridge bore and extending downwards and inwards to a main central outlet manifold. The sloped nature of the bores substantially reduces or virtually eliminates the amount of wasted product and increases both the efficiency and efficacy of the cleaning process.

The integrated cartridge plate may also include a recessed upper face. The upper face preferably recesses slightly downward from the outer edge of the plate to the outlet manifold (e.g., a frustoconical indentation). Again, this slight slope may reduce the amount of wasted product when compared to prior art filter housings with flat, removable cartridge plates. There may also be a channel in the upper face of the integrated base assembly that extends from the recessed portion of the face out into the top of the inlet manifold bore. When unfiltered product is drained from the dome after a product cycle, this channel preferably allows the unfiltered product to flow back into the inlet manifold for use in a future production cycle.

The present invention may also be adapted for use with an automated cleaning technology such as Clean-in-Place (CIP). Preferably, there is an opening in the top of the dome (e.g., a vertical access port) and a guide bore through the integrated cartridge plate which guides the tube-like CIP spray device assembly into the interior regions of the integrated filter housing. The CIP spray device assembly preferably includes tiny holes to emit and disperse cleaning media such as water, deionized water, steam, detergent, an acidic cleaning media, and/or a cleaning agent to automatically wash or sanitize the internal surfaces of the filter housing.

The spray device hole pattern, number of holes and diameter of individual holes of the spray device will depend on a number of factors. For example, the volume and pressure of available water at the filter housing installation may dictate hole size and placement. Further, the internal configuration of the multi-round filter housing itself will dictate hole pattern so that all surfaces can be contacted with cleaning media.

One of the novel features of the present invention is a system that provides a complete programmed washing of a contaminated filter housing such that the system will pass a riboflavin test. While those of skill in the art will recognize that there are various protocols to perform "riboflavin testing," the essential features of such a test involve soluablizing riboflavin, coating the interior elements of a filter housing with the riboflavin solution, subjecting the filter housing to the cleaning process, disassembling the various components of the filter housing and subjecting the internal elements to ultra-violet light to detect the presence of residual riboflavin solution by its florescence. As indicated, the CIP technology of the present invention passes such a riboflavin test such that no florescence is detectable in any interior element.

Because of the integrated design of the base unit (i.e., the absence of a separate, removable cartridge plate), the only removed component that may have to be cleaned externally (i.e., away from the site of the filter housing installation), is preferably the cartridge positioning plate. It is contemplated that certain embodiments of the present invention may include a cartridge positioning plate that can also be cleaned in place.

BRIEF DESCRIPTION OF THE DRAWINGS

The features, aspects, and advantages of the present invention will become better understood with regard to the following description, appended claims, and accompanying drawings where:

DESCRIPTION OF THE PREFERRED EMBODIMENTS

Figure 1:
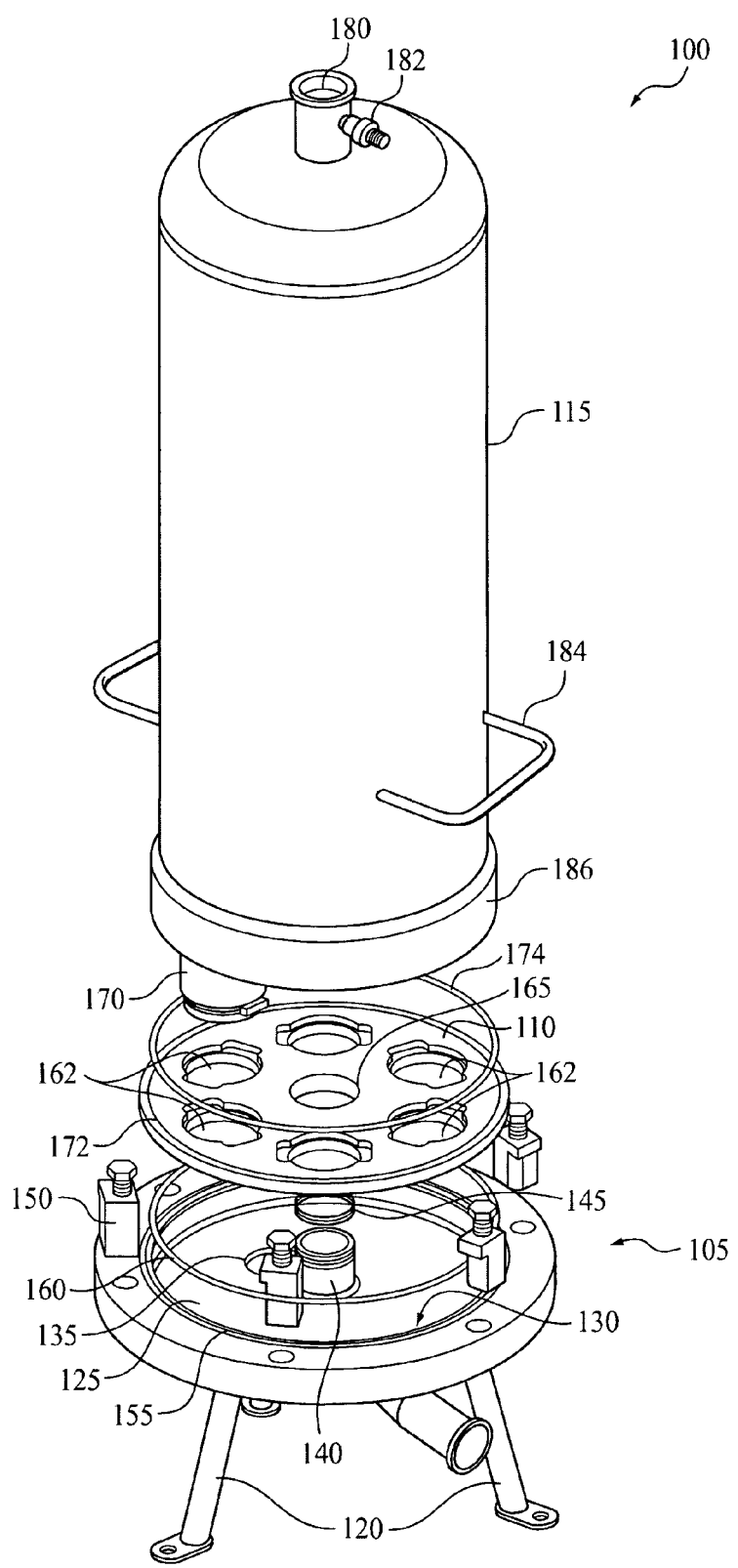
FIG. 1 details an exploded isometric section of a typical prior art filter housing.

FIG. 1 depicts a typical prior art filter housing 100 including a multi-stage base assembly 105, removable cartridge plate 110 and removable dome 115.

The base assembly 105 of the prior art filter housing 100 shown is supported by three legs 120 but can be fixed in a production line in a variety of standard configurations. A collection chamber 125 is recessed within the base assembly 105 towards the bottom of the filter housing 100. The collection chamber 125 is generally annular with a flat lower face 130 which includes an outlet manifold 135 to allow filtered product to exit the filter housing 100. An inlet manifold 140, which is used to introduce an unfiltered product into the filter housing 100, extends generally upward from the center of the lower face 130 of the annular collection chamber 125. The inlet manifold 140 extends upwards towards the top of the filter housing 100 and includes one or more O-ring sealing members 145 to seal the inlet manifold 140 to the removable cartridge plate 110.

The collection chamber 125 is surround by a raised wall on which a plurality of bolt assemblies 150 are located. The inside rim of the wall that surrounds the collection chamber includes a recessed annular ledge 155 that accepts insertion of an O-ring or other gasket-style sealant 160. This O-ring 160 facilitates seal formation with a cartridge plate 110 that is placed above the collection chamber 125. A flat, disk-shaped cartridge plate 110 includes multiple cylindrical apertures 162 bored therethrough. The central aperture 165 of the cartridge plate is a continuation of the inlet manifold 140, which generally includes at least one and may include additional O-rings 145 between the inlet manifold 140 and the center aperture 165 of the cartridge plate 110. A plurality of single-threaded, quarter-turn lock apertures 162 are arranged at roughly uniform intervals around the central inlet aperture 165. A plurality of threaded filter cartridges 170 are adapted to mate into the apertures 162 of the cartridge plate 110.

The cartridge plate 110 also includes an annular ledge 172 on the outer aspect of its upward face adapted to accept an additional O-ring 174. This second O-ring 174 facilitates seal formation between the cartridge plate 110 and the filter housing dome 115 which is placed over and around the cartridge plate 110 (as shown in FIG. 1). The dome 115 houses the full extent of the filter cartridges 170. A disk-shaped cartridge positioning plate (not shown) with circular apertures matched in number and size the plurality of filter cartridges 170, is positioned over the top of the filter cartridges to hold them generally parallel to each other.

The dome 115 extends above and forms a chamber around the filter cartridges and the cartridge positioning plate. Two lifting lugs (not shown) are located on the top exterior of the dome 115. A circular opening 180 that allows access through the top of the filter assembly 100 is located on the superior aspect of the dome 115. During normal processing operations, this opening may be a gauge port 180 for attachment of a standard pressure gauge. This access 180 is generally utilized by a spray device assembly for Clean-In-Place applications. In addition, a small sampling valve 182 may be located on the side of the gauge port 180, or separate from the gauge port 180 on the exterior of the dome 115. Two handles 184 are located approximately midway down the dome 115 to aid in the attachment and removal of the dome 115 to the filter housing base assembly 105. Around the rim of the open end of the dome extends an annular dome flange 186 that forms a small ledge along the exterior base of the dome 115.

To assemble the prior art filter housing 100, a first O-ring 160 is placed on the annular ledge 155 of the base assembly 105. At least one O-ring 145 is placed on the inlet manifold 140. The cartridge plate 110 is then seated over the top of these O-rings 145, 160 on the base assembly 105 and inlet manifold 140, thereby matching the O-rings 145, 160 to the lower ledge on the cartridge plate and the bore corresponding to the inlet manifold. Another O-ring 174 is then placed on the upper ledge 172 of the cartridge plate 110, and the filter cartridges 170 are "attached" or twisted into apertures 162 of the cartridge plate 110. Each of the individual filter cartridges 170 may have O-ring assemblies to form a seal between the cartridge 170 and the upper face of the cartridge plate 110 surrounding the cartridge filter bores 162.

The cartridge positioning plate is then seated over the top of the extending filter cartridges 170, and the entire filter housing 100 is assembled by placing the dome 115 on top of the base assembly 105 over the O-ring 174 on top of the cartridge plate 110. The bolt assemblies 150 located on the base 105 are secured around the dome flange 186 and tightened so that O-rings 174, 160, 145 are compressed to form a tight seal between the dome 115 and the cartridge plate 110, and between the cartridge plate 110 and the base 105 and between the cartridge plate 110 and the inlet port 140. Together, the base, the collection chamber 125, the O-rings, and the cartridge plate 110 are referred to as the base assembly 105.

To begin normal operation, the sampling/vent valve 182 at the top of the dome 115 is opened, and unfiltered product is pumped through the inlet manifold 140 to the main chamber inside the dome of the filter assembly 110. When the dome 115 is full of unfiltered product, the vent valve 182 is closed, forcing the product to flow through the walls of the vertically extending filter cartridges 170 and down the interior portion of the filter cartridges 170. The filtrate is collected in the collection chamber 125 at the bottom of the filter housing 100. This filtrate may then proceed through another filter housing or a series of filter housings or further processing. Following use, filtrate collects ("pools") on the horizontal aspect of the lower face of the collection chamber 125 and unfiltered product collects on the flat upper face of the cartridge plate 110. This prior art filter housing 100 also contains detachable parts (e.g., cartridge plate 110) and numerous crevices (e.g., multiple O-rings) that may lead to the accumulation of bacteria and to corrosion.

The limitations of this prior art filter housing 100 are even more pronounced when cleaning the filter housing 100 is considered. For example, to clean the prior art filter housing 100, the operator traditionally has to shut off processing of the filtered product, open the vent valve 182 and then open the drain valve (not shown). This procedure allows the product within the housing to drain "completely." Typically, the drain valve will be adjacent to or incorporated with the outlet manifold 135. After the product has drained out of the housing 100, the operator loosens the bolt assemblies 150 that secure the filter housing dome 115 to the base 105. The dome 115 may then be lifted up off of the base 105 clearing the vertically-placed filter cartridges 170 in the process. Generally, the weight of the dome 115 will require a mechanical lift device to engage the lifting lugs (not shown) to accommodate removal of the dome 115. Because of the flat upper surface of the cartridge plate 110, unfiltered product, which is at least wasteful and could even be harmful, may seep from the filter housing 100 when the dome 115 is removed.

The cartridge alignment plate is then lifted up and off of the cartridges 170, and the cartridges can be removed from the cartridge plate 110. These cartridges 170 may be disposed of and replaced with new filter cartridges for a future product run, or the filter cartridges 170 may alternatively be cleaned to be reused. The cartridge plate 110 may then be removed from the filter base assembly 105. The O-rings are removed, visually inspected for cracks or other disrepair and re-installed or replaced. The collection chamber 125, inlet 140 and outlet ports 135, and the drain valve are then thoroughly washed. The dome 115 and vent valve, cartridge plate 110, and cartridge alignment plate are brought to a cleaning station and cleaned away from the original site of the filter housing 100.

New O-rings or other gasket-based seals 145, 160, 174 may then be installed if needed on the inlet adapter 140 and/or the cartridge plate 110. The cartridge plate 110 is re-installed into the base assembly 105, and filter cartridges 170 are installed (or, in the case of reusable cartridges, re-installed) into the cartridge plate 110. The cartridge positioning plate is then positioned at the top of the filter cartridges 170, lowered into position and the dome 115 is once again brought over the top of the filter cartridges 170 and secured to the base assembly 105 by tightening the bolt assemblies 150, thereby sealing the dome 115 to the base 105 with the O-rings. The operator may then close the drain valve and begin processing filtered product into the dome 115 again. When the dome 115 is full of product, the operator closes the vent valve 182 in the top of the filter housing dome thereby forcing product through the filter cartridges 170 for collection.

Certain aspects of this prior art system have been improved by incorporating a spray device assembly into the cleaning process to force cleaning media, for example, water, deionized water, steam, detergent, an acidic cleaning media, and/or a cleaning agent, into the inside of the dome 115. This "Clean-In-Place" (CIP) system reduces the number of parts that need to be taken to a separate cleaning station to be sanitized prior to re-assembly and further processing of product. The prior art filter housing 100 of FIG. 1 may utilize such a CIP system. For example, following the disassembly of the filter housing 100, removal of the filter cartridges 170 and re-attachment of the dome 115 to the base 105, a spray device assembly may be inserted through the top of the dome 115 of the filter housing 100. This may require a special adapter in place of the removed cartridge plate. However, because the jets of fluid coming out of the spray device may not reach the underside of the cartridge plate 110 or in the crevices of the O-rings, and because the prior art cartridge plate 110 and collection chamber 125 generally include horizontal surfaces that do not facilitate complete draining, the cartridge plate 110 must be removed and cleaned separately. Further, the O-rings 145, 160 beneath the cartridge plate 110 and the base 105 must be removed and cleaned or replaced, as appropriate.

For example, paralleling the above cleaning description, once the dome 115, the filter cartridges 100 and cartridge positioning plate are removed, the cartridge plate 110 is taken to a separate cleaning station. With the CIP system, the dome 115 would thereafter be reattached to the base assembly 105 by securing the bolts 150. The spray device assembly would then be inserted through the hole 180 near the top of the dome 115 and the spray device tube would be connected to a water, deionized water, steam, detergent, an acidic cleaning media, and/or a cleaning agent. This system may then sanitize the remaining interior portions of the filter housing 100, but may not completely drain from the horizontal surfaces of all interior places. After CIP, the cleaned cartridge plate 110, new cartridge filters 170, and new O-rings are preferably installed.

In its broadest aspect, the present invention addresses some or all of the limitations found in the prior art by integrating the cartridge plate into the base assembly. This may reduce the number of O-ring joints, and therefore simplifies and intensifies the cleaning process. Such an integrated filter housing unit may contain sloped inner bores which allow product to flow without pooling and may be especially suited for a Clean-In-Place system.

Figure 2:
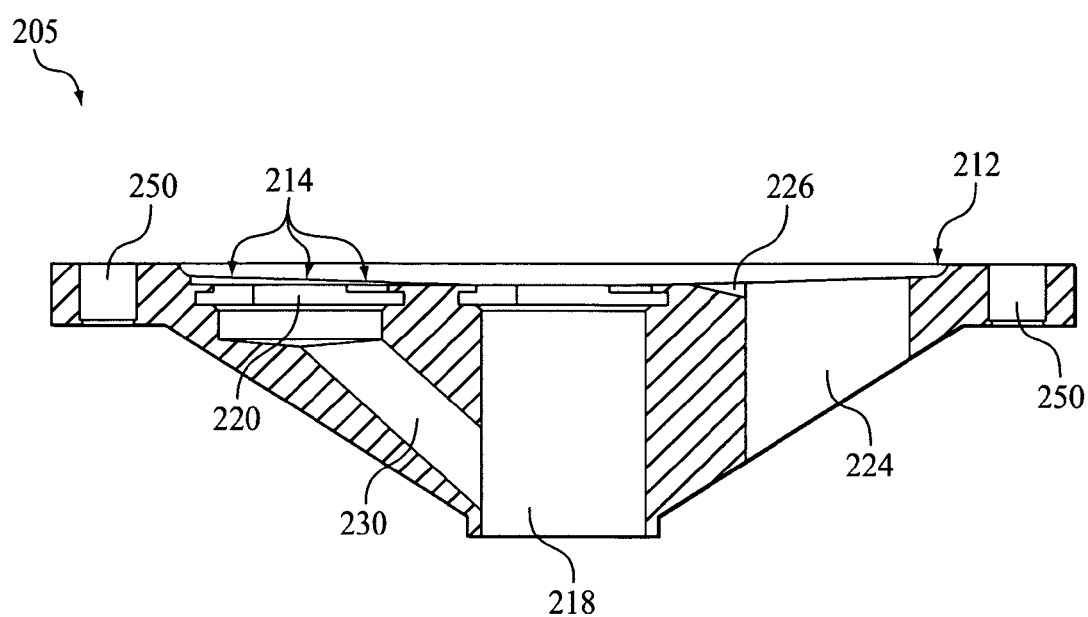
FIG. 2 shows a side cross-section of an integrated base assembly for use in the present invention.
Figure 3:
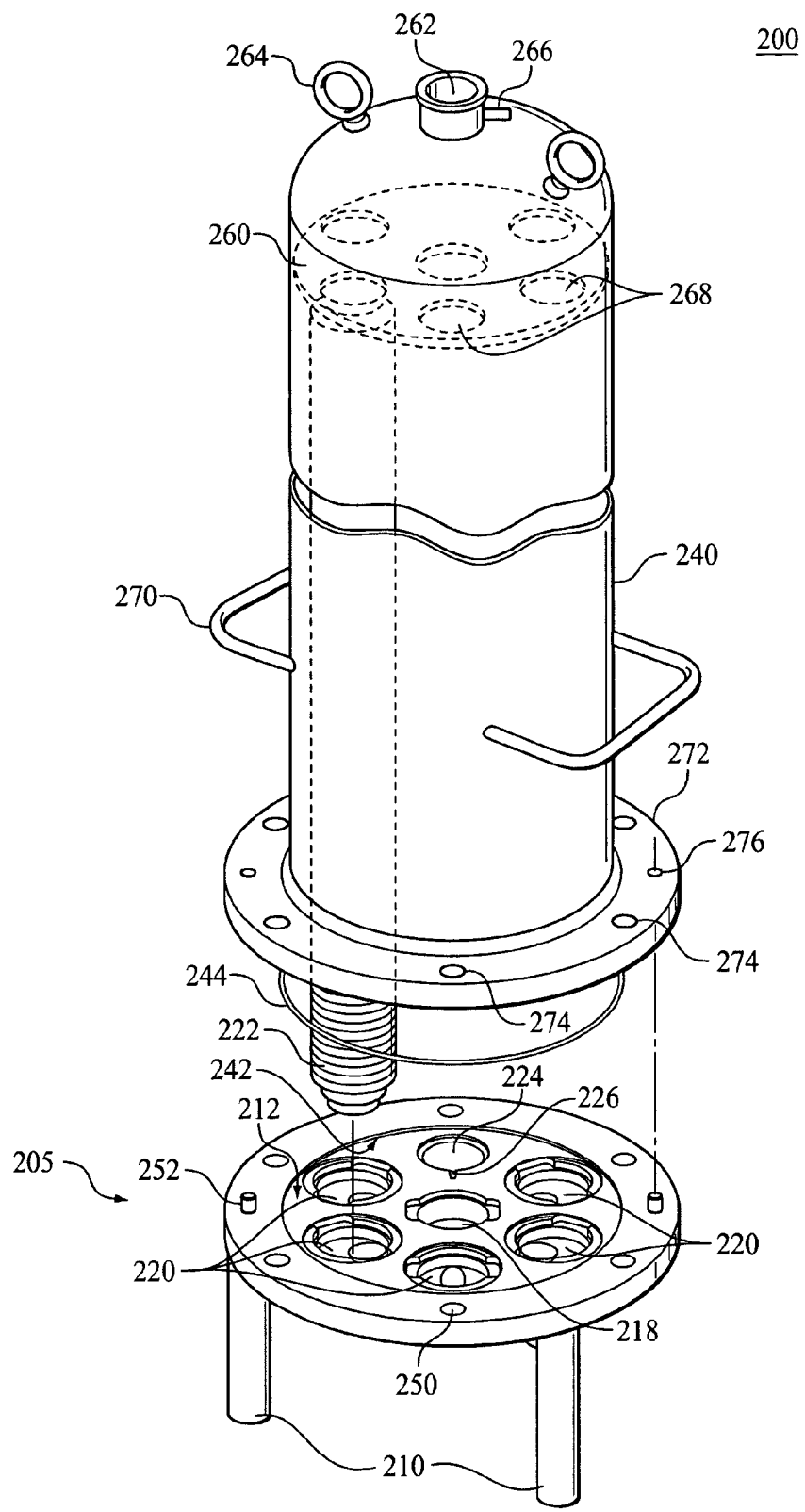
FIG. 3 details an exploded isometric view of one embodiment of the present invention.

FIG. 2 depicts a side cross-section of a base assembly 205 for use with an integrated filter housing 200, and FIG. 3 depicts one presently preferred embodiment of an integrated filter housing 200 utilizing said specialized base assembly 205. The complexity of the base assembly is dramatically reduced compared to prior art. For example, by eliminating the collection chamber, the thickness of the base may be reduced. The base assembly 205 of the filter housing 200 may be supported by a plurality of legs or any standard support structure now known or later developed 210.

With reference to FIGS. 2 and 3, the base 205 may include an integrated cartridge plate 212 with a recessed upper face 214, preferably recessed toward an outlet manifold of the upper face. For example, this recession may be in the shape of an upside-down truncated cone known as a frustoconical indentation or impression. As such, the upper face recess 214 may be shaped as a frustoconical indentation that terminates at a point that is not in the center of the upper face 214. The integrated cartridge plate 212 upper face is preferably circular with cylindrical apertures bored therethrough, arranged as a central aperture 218 with additional apertures extending radially outward at equal intervals around the central aperture 218. The central aperture 218 and preferably all but one of the other apertures 220 are dimensioned such that filter cartridges 222 may be matingly accepted by the integrated cartridge plate 212.

One of the non-central apertures 224 is preferably not dimensioned to accept a cartridge. This non-threaded aperture 224 serves as the inlet manifold for introduction of solution into the main interior chamber of the filter housing assembly 200. Because the inlet manifold 224 is integral to the base, at least one O-ring may be eliminated in this embodiment. The upper face of the integrated cartridge plate preferably includes a drainage channel 226 etched therein such that unfiltered product drains toward the inlet manifold bore 224. Therefore, when the operator shuts off the incoming unfiltered product, the portions of the product which do not drain down the outlet manifold 218 may drain back into the inlet manifold 224, rather than being "wasted" by pooling at the surface of integrated cartridge plate 212.

The integrated cartridge plate 212, into which the filter cartridges 222 are inserted, may also be specially machined such that the area around the outlet bore 218 is recessed or depressed 214. Because the outlet bore 218 is at a lower height than the outer portions of the upper face of the integrated cartridge plate 212, when the process is shut off, unfiltered product will preferably run down towards this outlet bore 218. This recession 214 preferably enables unfiltered product to be back-drained to the inlet manifold, and may allow the CIP system to work more effectively. When the filtering system is shut off, this recession 214 also acts to collect unfiltered product and direct it through the etched channel 226 down the inlet manifold 224 for reuse. The recession may take the shape of an upside-down truncated cone, known as a frustoconical indentation or impression.

With reference to FIG. 2, the interior portions of the integrated base assembly 205 are shown in cross-section. As seen in the example of FIG. 2, the outlet port 218 extends down through the center of the integrated base assembly 205, and the inlet port 224 extends vertically through an outer portion of the base assembly 205. It will be recognized that both the outlet port and the inlet port may be located in a variety of positions, dependant only upon the number of cartridge ports and the demands of the cleaning process. There is also a plurality of sloped bores 230 extending from the lower portion of each cartridge filter bore 220 down to the central outlet port bore 218. This sloped orientation allows filtered product to flow through the cartridge filter bores 220 to the outlet manifold 218 without pooling (as opposed to the prior art).

It is noted that the improved design of the present invention has eliminated the need for a collection chamber. This may be a significant improvement over the prior art in that any pooling of residual filtrate on the lower face of the collection chamber is avoided This improvement also reduces the number of components in the filter housing 200 because the detached cartridge plate of the prior art is wholly eliminated. It is further noted that the number of O-rings that are employed in the assembly of the filter housing is reduced. For example, there is no O-ring between the base and the cartridge plate in this embodiment because the base and cartridge plate are an integrated, single structure 205, thus reducing the likelihood of seal failure. Additional advantages over the prior art may include the elimination of the O-ring or O-rings between the inlet port 224 and the cartridge plate 212, and the adaptability of the present invention to a Clean-In-Place process.

The top of the base assembly 205 preferably includes an annular recess 242 on the inner aspect of its upper face that accepts a corresponding annular ledge (not shown) of the dome. This annular ledge of the dome contains the O-ring 244 which seals the dome to the base. The raised annulus surrounding the integrated cartridge plate possesses several threaded holes 250 that are spaced at regular intervals. During filter housing 200 assembly, bolts are threaded into these holes 250 in order to secure the dome 240 to the base assembly 205. In addition, pins 252 are placed at regular intervals extending vertically from the base assembly 205. These pins 252 guide the operator in mating the dome 240 to the base assembly 205 and may stabilize the interaction between the base assembly 205 and the dome 240 during filter housing 200 assembly and disassembly. The base 205 of the filter housing 200 is preferably a single machined piece of metal thus reducing the overall number of separate parts contained in the filter housing 200.

The filter housings of the present invention are preferably constructed of nonferrous metal, such as stainless steel, but may also be composed of other nonferrous metals such as Iconel, Hastelloy, and alloys such as AL-6XN™. Further, it may also be possible to practice various embodiments of the present invention by employing high-density, nonporous plastics. Depending on the specific filter process requirements, it may also be desirable to form the various elements of the filter housing from heterologus materials (e.g., base made of stainless steel coupled to a dome of high-density plastic).

The dome 240 is removably connected to the base 205. For example, the dome 240 may be secured to the base 205 by a tension clamp, threaded engagement, magnetism or any other means that allows separation of the dome 240 from the base 205.

The dome 240 extends vertically and forms a chamber around the filter cartridges 222 and the disk-shaped cartridge positioning plate 260. A valve 266 is preferably located on the superior aspect of the dome that may be used to vent air during filling of the dome or alternatively, for sampling of product during processing. An opening 262 that allows access to the top of the filter assembly 200 is located on the superior aspect of the dome 240. In certain applications, this opening 262 may also serve as a gauge port during the filtration process. This opening 262 is aligned such that a spray device assembly for Clean-In-Place applications may be inserted to traverse the interior of the dome 240 and terminate within the outlet port 218 of the base 205. It is contemplated that either opening 262 and/or outlet port 218 may be located somewhere other than at their respective centers. Preferably, the spray device assembly will terminate at a point that facilitates the distribution of cleaning solution to all interior elements and surfaces of the dome 240 and base assembly 205, including direct contact with the sloped cartridge filter bores 230. Two handles 270 are located approximately halfway down the dome 240 to aid in the placement and removal of the dome 240 to the filter housing base assembly 205. At the rim of the open end of the dome 240 there is wide-lipped flange 272 that is removably connected to the base flange. For example, it may posses threaded 274 and non-threaded 276 holes at regular intervals. Bolts can be inserted through the threaded holes 274 and are used to secure the dome 240 to the base assembly 205 during filter housing 200 assembly. Pins 252 from the base assembly 205 may be arranged to be inserted into the wide-lipped flange 272 on the dome 240 and aid in the alignment of the threaded holes 274 in the wide-lipped flange 272 to the threaded holes 250 in the base assembly 205.

During normal operation, unfiltered product is pumped into the dome 240 via the inlet manifold 224. While the dome 240 is being filled, air is allowed to escape via the valve 266 (opened) that is located on the superior aspect of the dome 240. After the dome 240 is filled, the valve 266 is closed, thus forcing unfiltered product into and down through the filter cartridges 222. Filtrate (filtered product) travels down the interior portions of the cartridge filters 222, through the sloped bores 230 that connect the cartridge filter bores 220 to the outlet manifold, and out of the filter housing 200 for collection.

When the filtering process is over, unfiltered product is no longer pumped into the dome 240. Instead, the vent valve 266 is opened and unfiltered product is drained from the dome 240 back through the inlet manifold 224 (preferably to be re-used in a future filtering process). The etched drain channel 226 of the cartridge plate 212 is such that unfiltered product drains toward the inlet manifold 224. A slope in the channel 226 (best shown in FIG. 2) toward the inlet manifold 224 allows the solution to drain into the inlet manifold 224. Having sloped openings in the base 205 to seat the disposable media 222 (cartridges) versus a separate cartridge plate and flat base eliminates waste of product due to pooling of product during process or accumulation of cleansing medium during cleaning.

Figure 4:
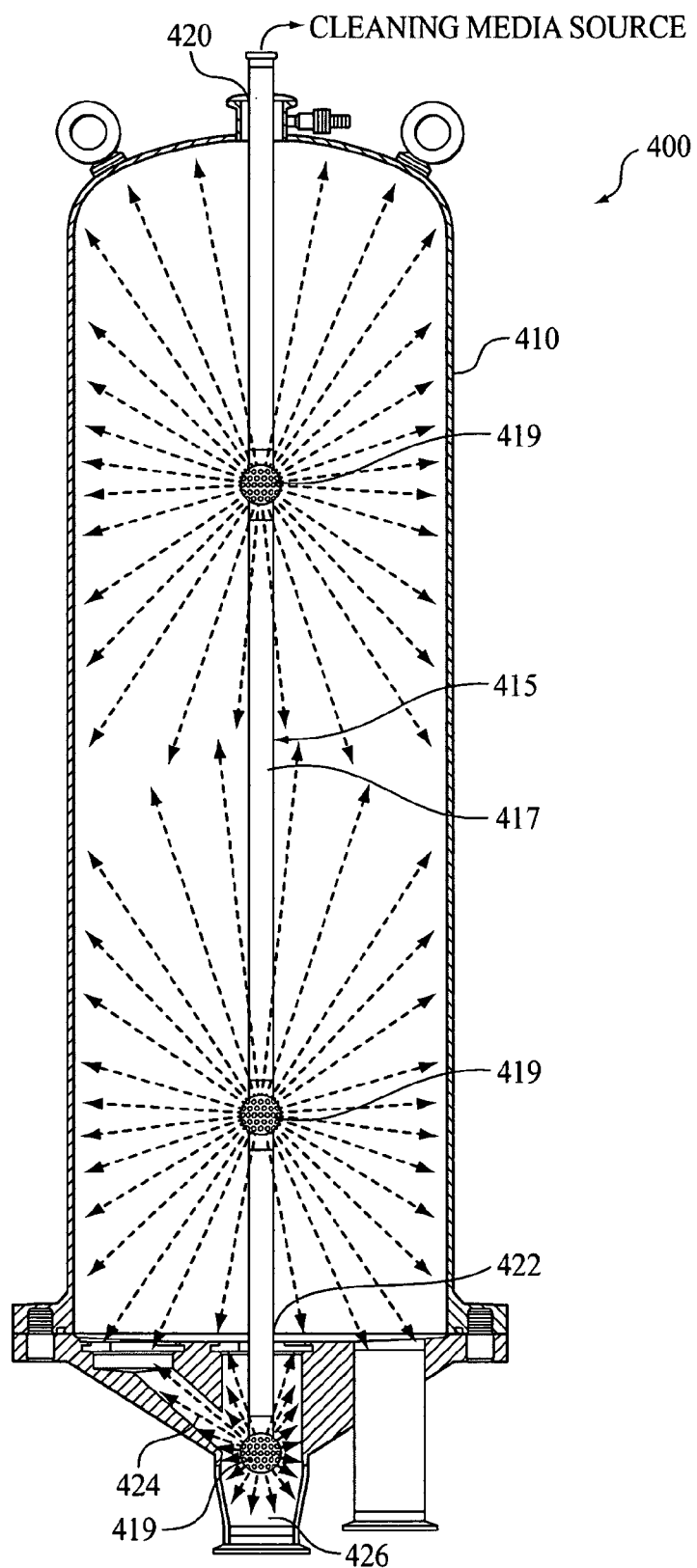
FIG. 4 is a side view of one embodiment of the present invention with a sprayer assembly inserted therein for cleaning.

FIG. 4. depicts one presently preferred method of cleaning the integrated filter housing using Clean-In-Place technology. The dome 410 is removed from the filter assembly 400 by removing the bolts that secure the dome 410 to the base assembly 405. The positioning plate is removed from the filter cartridges, and the cartridges themselves are removed from the filter housing (to be cleaned or replaced). The dome is then re-attached. A spray device assembly 415, including, for example, a tubular element 417 incorporating various spray device elements 419 may be inserted through the access opening (e.g., gauge port) at the top of the dome 410. The spray device tube 417 is preferably connected to a source of water, steam, or other cleaning fluid, the selection of which will be determined by the filtering process and system requirements. The spray device tube 417 is preferably adapted to extend vertically down into the outlet manifold bore 422 to an extent at least as low as the point where the sloped cartridge filter bores 424 meet the central outlet manifold bore 426 (FIG. 4). This orientation allows all aspects (i.e., surfaces and elements) of the integrated base assembly 405 to be cleaned using CIP technology, rather than just certain aspects of the interior of the dome 410.

At least one embodiment of the present invention is much more easily cleaned in place compared to the prior art. There is no removable cartridge plate to be cleaned externally. The inserted spray device is able to access all areas of the dome that are exposed to unfiltered product as well as all areas of the base assembly that are in contact with both unfiltered and filtered product (filtrate). The one-piece construction of the base and the sloped cartridge bores in the base greatly reduce the number of areas where solution and bacteria can accumulate thus reducing the likelihood of bacterial contamination and corrosion (e.g., no horizontal surfaces and fewer O-ring joints). Also, the sloped bores and beveled upper face of the integrated cartridge plate allow better, more complete draining of both product and cleaning solution during the CIP process.

Figure 5:
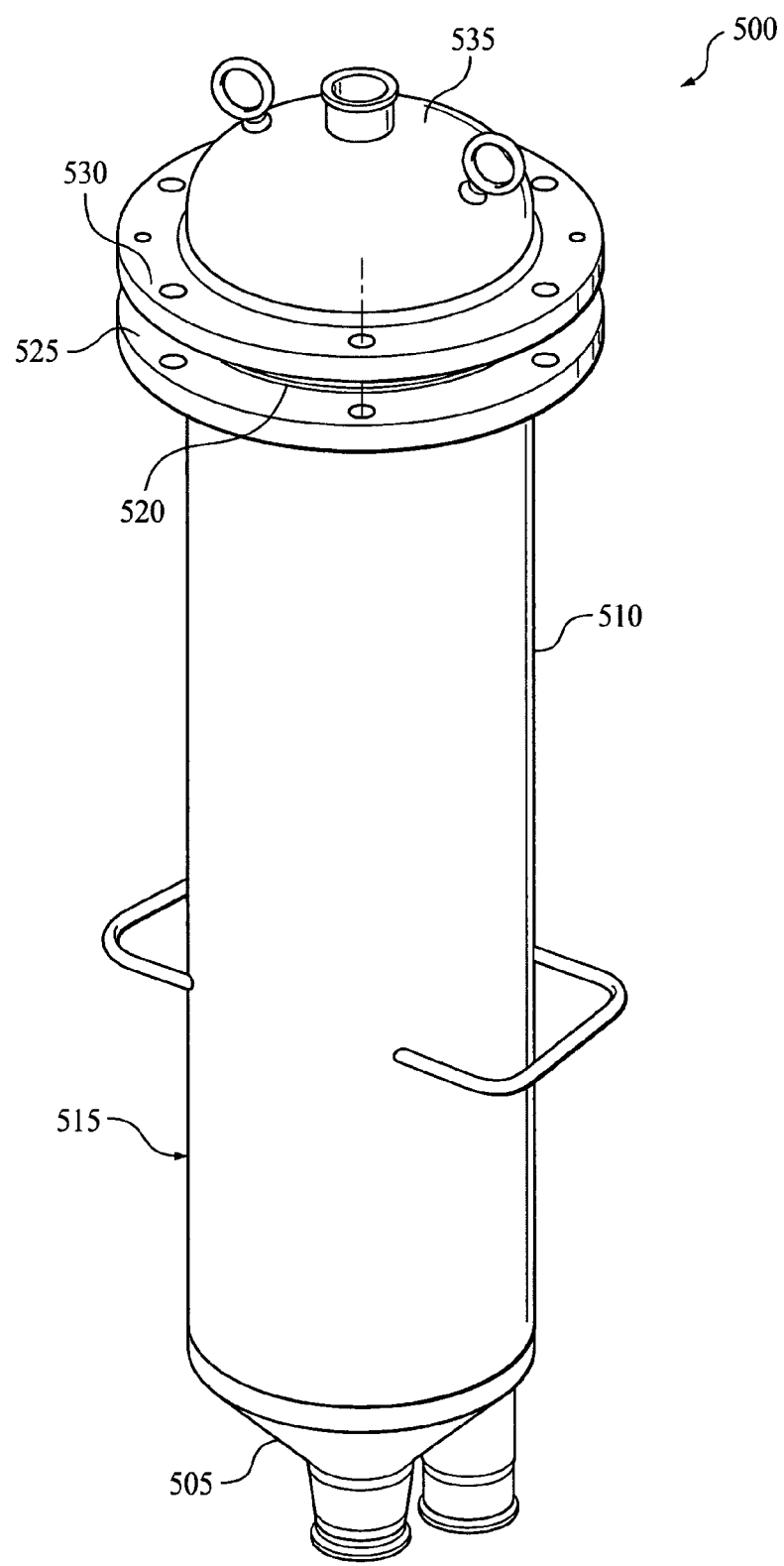
FIG. 5 is an isometric view of one embodiment of the present invention in which the dome is fully integrated with the base assembly.

FIG. 5. displays an alternative presently preferred embodiment of an integrated filter housing 500 wherein the walls of the dome 510 are integrated with the base assembly 505 into one piece. The internal structure of the base assembly 505 in this embodiment of the present invention is preferably similar to that depicted in FIGS. 2 and 3. The design displayed in FIG. 5 decreases the number of individualized parts which must be separately cleaned compared to the prior art (e.g., no separate cartridge plate). In addition, there is no O-ring at the bottom of the filter assembly 500 (i.e., between the dome and the integral base) that may collect bacteria because it has now been moved to the top of the filter housing 500 between the upper dome flange 525 and dome cap flange 530. The replacement of filter cartridges and the cleaning of the interior of the filter housing may be greatly simplified in this embodiment of the present invention. To clean the interior of the filter housing 500 or remove filter cartridges, the operator preferably removes the dome cap 535 of the filter housing 500. The user does not have to lift the entire dome off of the base and over the cartridge. In this embodiment, the total weight of the filter housing portion that has be to removed 535 for cleaning and cartridge replacement is greatly reduced. In fact, in certain embodiments, a mechanical lifting device may not be necessary due to the greatly reduced size and weight of the portion being removed. Further, the vertical clearance required to utilize this embodiment in a production installation is proportionately reduced.

Currently, users must go through a time consuming manual disassembly procedure to thoroughly clean sanitary multiround filter housings. One step in the cleaning process is to remove the cartridge plate and clean it at some location which is usually located a distance away from where a filter housing is customarily installed in a process system. This step is preferably eliminated in the present invention. A filter housing may still have to be disassembled to change the disposable media (cartridges). However, process downtime due to cleaning is preferably reduced because there is no separate cartridge plate that needs to be removed and cleaned independently of flushing the remaining components of the filter housing. Rather, the entire filter housing assembly can be cleaned-in-place. Further, certain embodiments of the present invention may reduce operator fatigue due to the simplification of the cleaning process and the decreased weight to be lifted during disassembly and cleaning.

While specific embodiments and methods for practicing this invention have been described in detail, those skilled in the art will recognize various manifestations and details that could be developed in light of the overall teachings herein. Accordingly, the particular arrangements disclosed are meant to be illustrative only.

What is claimed is:

1. A filter housing comprising:
   a dome; and
   an integrated base assembly, wherein said base assembly comprises:
      a plurality of cartridge filter bores having a lower portion,
      an inlet manifold,
      an outlet manifold,
      an integral cartridge plate with an upper face, wherein the upper face of said cartridge plate is recessed toward the outlet manifold, and
      a channel in said upper face of the cartridge plate, wherein said channel feeds into said inlet manifold.

2. A filter housing comprising:
   a dome; and
   an integrated base assembly, wherein said base assembly comprises:
      a plurality of cartridge filter bores having a lower portion,
      an inlet manifold,
      an outlet manifold,
      an integral cartridge plate with an upper face, wherein the outlet manifold extends through the upper face of the cartridge plate, and
      a plurality of sloped bores connecting the lower portion of the plurality of cartridge filter bores with the outlet manifold.

3. The filter housing of claim 2, wherein said outlet manifold is at the center of the cartridge plate.

4. A filter housing cleaning system, comprising:
a filter housing dome including a vertical access port through the top of said dome;
an integrated base including a plurality of cartridge filter bores, an inlet bore, an outlet bore, and an integral cartridge plate; and
a cleaning wand, wherein said cleaning wand is adapted to be inserted through the vertical access port in the top of said dome and is further adapted to be inserted through a bore in said cartridge plate.

5. The system of claim 4, wherein said cleaning wand includes a plurality of spray devices.

6. The system of claim 5, wherein said spray devices are designed to disperse a cleaner onto each interior surface of the filter housing.

7. The system of claim 4, wherein the integral cartridge plate has an upper face which includes a sloped recession.

8. A filter housing, comprising:
a dome; and
a base assembly connected to the dome, wherein said base assembly comprises:
a plurality of cartridge fiber bores each adapted for matingly accepting a cartridge filter,
an inlet manifold,
an outlet manifold, and
a cartridge plate with an upper face, wherein the plurality of cartridge filter bores, the inlet manifold and the outlet manifold are bored through the upper face of said cartridge plate, and wherein the upper face slopes downwardly from an outer edge of the upper face to the outlet manifold.

9. The filter housing of claim 8, wherein said dome comprises a vertical access port through the upper portion of the dome.

10. The filter housing of claim 8, including only one gasket-style seal between said dome and said base assembly.

11. The filter housing of claim 10, wherein said gasket-style seal is an O-ring.

12. The filter housing of claim 8, wherein the upper surface of the cartridge plate forms a frustoconical-shaped indentation.

13. A filter housing for use in a filtering process of a product, comprising:
a dome; and
a base assembly connected to the dome, wherein said base assembly comprises:
a plurality of cartridge filter bores each adapted for matingly accepting a cartridge filter,
an inlet manifold,
an outlet manifold, and
a cartridge plate with an upper face, wherein the plurality of cartridge filter bores, the inlet manifold and the outlet manifold are bored through the upper face of said cartridge plate, and wherein the upper face includes a recession which slopes to the inlet manifold, whereby the recession directs unfiltered product towards the inlet manifold when the filtering process is over.

14. A filter housing comprising:
a dome; and
an integrated base assembly, wherein said base assembly comprises:
a plurality of cartridge filter bores having a lower portion,
an inlet manifold,
an outlet manifold,
an integral cartridge plate with an upper face, and
a channel in said upper face of the cartridge plate, wherein said channel feeds into said inlet manifold.

* * * * *